United States Patent
Ramappan et al.

(10) Patent No.: US 7,131,425 B2
(45) Date of Patent: Nov. 7, 2006

(54) METHOD TO CONTROL AUTO-IGNITION IN AN INTERNAL COMBUSTION ENGINE EQUIPPED WITH VARIABLE VALVE TIMING CONTROL

(75) Inventors: Vijay Ramappan, Pittsford, NY (US); Brian R. Lovegrove, Kokomo, IN (US); Philip Allen Karau, Grand Blanc, MI (US); Sergio Eduardo Garcia, Webster, NY (US)

(73) Assignee: Delphi Technologies, Inc., Troy, MI (US)

( * ) Notice: Subject to any disclaimer, the term of this patent is extended or adjusted under 35 U.S.C. 154(b) by 36 days.

(21) Appl. No.: 11/103,407

(22) Filed: Apr. 11, 2005

(65) Prior Publication Data
US 2006/0225700 A1   Oct. 12, 2006

(51) Int. Cl.
*F02P 5/05* (2006.01)
*F02P 5/00* (2006.01)
(52) U.S. Cl. ............... 123/406.21; 123/406.29
(58) Field of Classification Search ........... 123/406.21, 123/406.29, 90.15, 90.16, 90.17, 90.18, 90.31
See application file for complete search history.

(56) References Cited

U.S. PATENT DOCUMENTS

| 5,520,145 | A  | * | 5/1996  | Nagai et al. ........... | 123/90.17 |
| 6,769,404 | B1 |   | 8/2004  | Aoyama et al. |  |
| 6,910,461 | B1 | * | 6/2005  | Tanei et al. ........... | 123/406.29 |
| 2004/0237917 | A1 | * | 12/2004 | Yasui et al. ........... | 123/90.15 |
| 2005/0000480 | A1 | * | 1/2005  | Yasui et al. ........... | 123/90.16 |

* cited by examiner

*Primary Examiner*—Mahmoud Gimie
(74) *Attorney, Agent, or Firm*—Paul L. Marshall

(57) ABSTRACT

A method and control system to accomplish knock control on a multi-cylinder spark-ignition internal combustion engine equipped variable cam phasing system, comprising monitoring cam position, crankshaft position, and, engine knock signal, determining cam position relative to crankshaft position, and implementing either a global cylinder knock control strategy or an individual cylinder knock control strategy, based upon whether the determined cam position relative to crankshaft position is near a default position, the determined cam position indicates the variable cam phasing system is operating in a transient mode, or, the determined cam position relative to crankshaft position is substantially different from the default position.

10 Claims, 3 Drawing Sheets

METHOD TO CONTROL AUTO-IGNITION IN AN INTERNAL COMBUSTION ENGINE EQUIPPED WITH VARIABLE VALVE TIMING CONTROL

TECHNICAL FIELD

This invention pertains generally to internal combustion engine control systems, and more specifically to spark-ignition control of an internal combustion engine equipped with a variable valve timing system.

BACKGROUND

Modern spark-ignition internal combustion engines are generally equipped with sensors and associated control systems operable to detect auto-ignition of a combustion charge, also referred to as detonation or engine knock. The auto-ignition of an air/fuel combustion charge generally occurs under severe engine operation, including high load operation or high temperature operation, especially in engines operating at high compression ratios. Under such conditions, a combination of thermal energy transferred to the combustion charge, coupled with increase in combustion pressure due to engine load, causes uncontrolled, rapid, and uneven combustion of the air/fuel charge in the cylinder. As such, knock occurs when portions of the air/fuel combustion charge in the cylinder auto-ignite, instead of a controlled ignition initiated by an electrical arc created in a spark plug inserted into the combustion chamber. A auto-ignition event creates unplanned and uncoordinated pressure pulses in the combustion chamber that induce thermal and vibrational stresses on various engine components, including pistons, crankshaft, and intake and exhaust valves. The induced thermal and vibrational stresses may lead to catastrophic failures of the engine components.

Manufacturers of modern engines and control systems have implemented systems to control and compensate for engine knock. The control systems include sensors and control systems operable to detect auto-ignition of a combustion charge which change spark timing of the engine to reduce the occurrence of knock events. Such control systems employ one or more knock sensors attached to the engine near the cylinders. Knock sensors are generally piezoelectric accelerometer devices operable to sense vibration. Output from each knock sensor is input to the engine controller. When a filtered signal from the sensor exceeds a threshold value, the controller implements control schemes to reduce knock, generally by retarding timing of spark ignition. The ignition retard scheme may be specific to a cylinder, to a bank of cylinders, or globally applied to all cylinders in the engine. A knock control scheme generally continues until the knock signal is below the threshold value.

Detection of spark knock in an internal combustion engine is confounded by the presence of signal noise and vibrations incidental to normal combustion and engine operation. Both electrical and mechanical noises and vibrations may be included in a signal from a knock sensor. Mechanical noise, as may be caused by closing of engine valves is especially significant with an accelerometer-type knock sensor, because impact of a valve against a valve seat typically sends a sharp vibration throughout the engine.

Skilled practitioners have typically addressed the issue of noise caused by valve closing by placing the knock sensor in a location that minimizes magnitude of noise introduced by valve closing, but still able to detect engine knock. The problem has also been addressed by employing multiple sensors on an engine, so any significant knock signal in each cylinder is sensed by at least one of the sensors. The engine controller is then programmed to select the appropriate sensor for knock sensing and detection in each cylinder, using predetermined signal sampling techniques and signal-to-noise ratio analysis. Skilled practitioners have also typically addressed the issue of noise caused by valve closing by time windowing, wherein the controller monitors the knock sensor signal only during a specific time window, based upon engine rotational position. The time window is defined to avoid valve closing noise, yet capture a significant portion of the spark knock signal. Most skilled practitioners tasked to implement a knock detection system for a modern engine use a combination of the above two methods. A knock system may be readily implemented to avoid signal noise problems caused by normal combustion operation through the effective design and placement of the knock sensor in conjunction with time windowing strategies for monitoring signal output.

Implementation of variable valve control systems onto modern engines may affect the ability of the controller to accurately discriminate between normal engine noise and spark knock. A typical variable valve control system comprises a cam phasing system that adjusts opening and/or closing times of engine valves relative to piston position to improve or alter engine operating characteristics. Any change in timing and magnitude of normal engine mechanical noise due to an adjustment of opening and/or closing time of engine valves must be filtered to permit accurate sensing of engine knock. The knock control scheme is typically able to accommodate adjustment of opening and/or closing time of engine valves by adjusting the time window during when the knock sensor signal is monitored. This scheme works when the adjustment in cam phasing is predictable.

Under certain conditions, actual cam position may deviate from cam position scheduled by the controller. Such conditions occur when cam phasing is disabled due to excessive engine oil temperature or other engine control or protection schemes. Actual cam position may deviate from scheduled cam position during transient events, i.e. when the cam phaser is changing rotational position of the cam relative to the crankshaft. Under these conditions the actual cam position does not match the scheduled cam position due to response lag of the cam phaser. This may lead to an inability to filter actual engine and valve noise resulting in a false detection of engine knock and inappropriate spark correction to reduce knock. This may instead lead to an inability to detect an actual spark knock event. In both circumstances, there is a possibility of reduced engine performance in terms of power, fuel economy, or audible knock noise. There is risk of damage to the engine and catalytic converter due to excess knock.

Engineers have attempted to address the problem by redesigning and implementing improved knock sensing hardware and enhancing signal filtering of knock signals, to improve rejection of engine operation noise, including valve closing noise. Such efforts have not been completely successful. There is therefore an ongoing need to detect auto-ignition events on modern engines equipped with variable valve timing systems, including variable cam phasing systems.

SUMMARY OF THE INVENTION

In accordance with the present invention, an improvement over conventional engine controls is provided, comprising a method and control system to accomplish knock control on a multi-cylinder spark-ignition internal combustion engine equipped with a variable cam phasing system. The improvement comprises monitoring cam position, crankshaft position, and, engine knock signal, determining the cam position relative to the crankshaft position, and implementing either a global cylinder knock control strategy or an individual cylinder knock control strategy, based upon whether the determined cam position relative to crankshaft position is substantially near a default position, the determined cam position indicates the variable cam phasing system is operating in a transient mode, or, the determined cam position relative to crankshaft position is substantially different from the default position.

Another aspect of the invention includes implementing the global cylinder knock control strategy based upon the engine knock signal, comprising determining which cylinder is being monitored, selecting a knock signal threshold based upon the determined cylinder, selecting a modified time window during which the engine knock signal is monitored, and controlling ignition timing to all cylinders when the engine knock signal exceeds the selected knock signal threshold for any one of the plurality of cylinders during the selected modified time window.

Another aspect of the invention includes selecting a normal knock threshold when the determined cylinder is a normal cylinder, and selecting a high knock threshold when the determined cylinder is a noisy cylinder.

Another aspect of the invention includes controlling ignition timing to each of the plurality of cylinders when the engine knock signal exceeds the selected knock signal threshold for any one of the plurality of cylinders during the selected modified time window comprises retarding ignition timing to each of the plurality of cylinders.

Another aspect of the invention includes implementing the individual cylinder knock control strategy, comprising determining which cylinder is being monitored, determining a scheduled cam position, selecting a knock signal threshold based upon the monitored cam position and the scheduled cam position, selecting an normal time window during which the engine knock signal is monitored, and, controlling ignition timing to the monitored cylinder when the engine knock signal exceeds the selected knock signal threshold for the monitored cylinder during the selected normal time window.

Another aspect of the invention includes implementing the individual cylinder knock control strategy based upon the engine knock signal during transient mode, including determining which cylinder is being monitored, determining the controller has commanded the cam phaser to move, selecting a knock signal threshold based upon the monitored cam position and a transient offset value, selecting a normal time window during which the engine knock signal is monitored, controlling ignition timing to the monitored cylinder when the engine knock signal exceeds the selected knock signal threshold for the monitored cylinder during the selected normal time window. These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF AN EMBODIMENT

Figure 1:
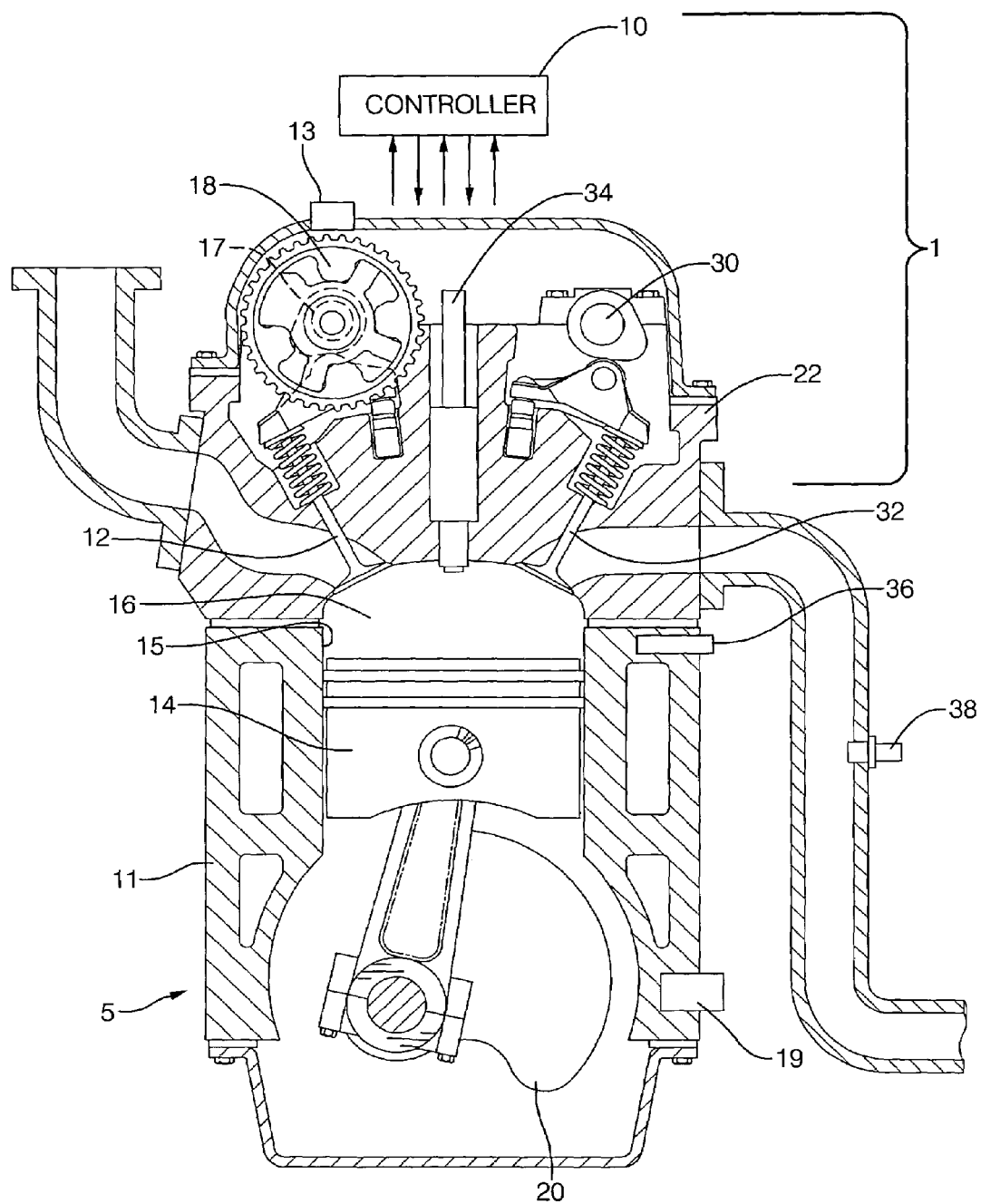
FIG. 1 is a schematic diagram of an engine and control system, in accordance with the present invention.

Referring now to the drawings, wherein the showings are for the purpose of illustrating the invention only and not for the purpose of limiting the same, FIG. 1 shows an internal combustion engine and control system 1 which has been constructed in accordance with an embodiment of the present invention. The exemplary internal combustion engine and control system 1 comprises a spark-ignition port fuel injection engine 5 and a controller 10. The exemplary engine 5 is equipped with a dual overhead cam system including a variable cam phasing system 18 attached to the intake camshaft 17, and operable to control opening and closing times of intake valves 12. The engine 5 includes base engine components, sensing devices, output systems and devices, described in detail hereinafter. The exemplary controller 10 comprises an electronic controller signally connected to a plurality of engine and vehicle sensors, operably connected to a plurality of output devices, and containing various pre-established software algorithms and predetermined calibrations. The exemplary controller 10 includes at least one microprocessor, associated memory devices, input devices for collecting and monitoring input from external analog and digital devices, and output drivers for controlling output devices. The controller 10 is operable to monitor engine operating conditions and operator inputs using the plurality of sensors, and control engine operations with the plurality of output systems and actuators, using the pre-established algorithms and calibrations that integrate information from monitored conditions and inputs. A skilled practitioner designs and implements software algorithms and calibrations which are executed in the electronic controller 10 to monitor the engine operating conditions and operator demands using the plurality of sensors, and control the plurality of engine actuators accordingly. The software algorithms and calibrations are preferably inserted into software of the engine controller 10 during engine development, prior to start of production.

The base engine components of the exemplary system include an engine block 11 with a plurality of cylinders 15. Each cylinder 15 contains a piston 14 operably attached to a crankshaft 20 at a point eccentric to an axis of rotation of the crankshaft 20. There is a head 22 at the top of each piston 14 containing an intake camshaft 17 and an exhaust camshaft 30, one or more air intake valves 12 per cylinder and one or more exhaust valves 32 per cylinder, and a spark plug 34. A combustion chamber 16 is formed within the cylinder between the piston 14 and the head 22. The intake camshaft 17 is operable to open and close each intake valve 12, and is connected to the variable cam phasing system 18. The variable cam phasing system 18 preferably comprises a single vane-type variable cam phaser assembled to an end of the intake camshaft 17, and includes an oil control valve (not shown) operably connected to the controller 10, as described hereinafter. The camshafts 17, 30 and the variable cam phasing system 18 are driven by a cam timing chain (not shown) operably connected to the crankshaft 20. The variable cam phasing system 18 is operable to control rotation of the intake camshaft 17, and hence the opening and corresponding closing of each intake valve 12 relative to crankshaft position and a top-dead center point of each piston 14 in each corresponding cylinder 15. Mechanization of a variable cam phasing on an internal combustion engine is known to one skilled in the art.

The sensing devices of the exemplary internal combustion engine 5 are operable to measure ambient conditions, various engine conditions and performance parameters, and operator inputs. The sensing devices preferably include a crank sensor 19, a cam position sensor 13 for the intake camshaft 17, a piezoelectric accelerometer knock sensor 36. There is a plurality of other engine sensors (not shown), and one or more oxygen sensors or other exhaust gas sensors 38. Engine monitoring sensors are known to one skilled in the art.

In operation, the controller 10 is electrically operably connected to the oil control valve (not shown). The oil control valve is preferably a pulsewidth-modulated ('PWM') control valve operable to fluidly control flow of pressurized engine oil from an engine oil pump (not shown) to the variable cam phaser 18. The controller 10 operates by sending a PWM electrical signal to the oil control valve to control valve opening and corresponding flow of pressurized engine oil to the vane-type variable cam phaser 18, based upon a predetermined algorithm and control strategy. The cam position sensor 13 is operable to measure angular rotation of the camshaft and is signally electrically connected to the controller 10. The controller 10 uses internal control algorithms and calibrations to determine the appropriate PWM electrical signal to send to the oil control valve to control flow of pressurized engine oil to the variable cam phaser 18, based upon the angular rotation of the intake camshaft 17 and a desired angular rotation of the camshaft. Control of the engine 5 and variable cam phasing system 18 using the controller 10 is well known to those skilled in the art.

In ongoing operation of the preferred embodiment, the engine operates in a customary four-cycle mode, wherein an intake cycle comprises intake of a combustion charge of air and fuel into the cylinder; followed by a compression cycle of the air and fuel in the cylinder; followed by a combustion event and power/expansion cycle; followed by an exhaust cycle; subsequently leading to another intake cycle. The combustion charge comprising a mixture of air and fuel is inlet through the air intake valve 12 into the combustion chamber 16, and is ignited by the spark plug 34, according to predetermined conditions. Ignition of the air/fuel mixture causes an increase in pressure in the combustion chamber 16, forcing the piston 14 to move linearly along the length of the cylinder 15, away from the head 22. The movement of the piston 14 in turn rotates the crankshaft 20. The crankshaft 20 causes the piston 14 to again move toward the head 22 after the crankshaft 20 has rotated to a furthest point of eccentricity. The operation of the spark-ignition internal combustion engine is well known to one skilled in the art.

Figure 2:
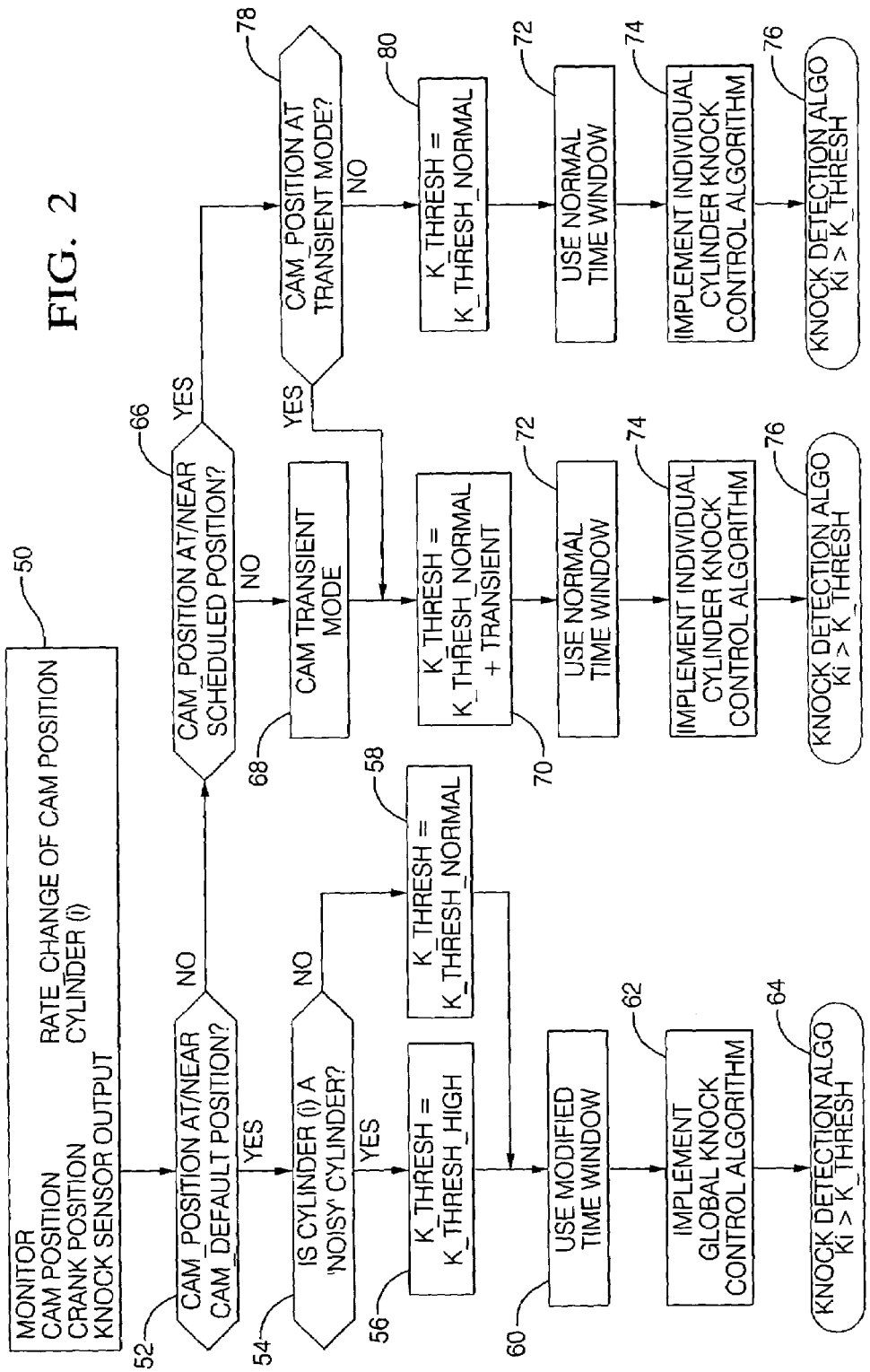
FIG. 2 is a flowchart, in accordance with the present invention.

Referring now to FIG. 2, a method to control the exemplary spark-ignition internal combustion engine 5 having the variable cam phasing system 18 is shown, in accordance with the present invention. Overall, the method is executed in the controller 10 using various predetermined algorithms and calibration values. The exemplary method preferably includes monitoring intake camshaft 17 position using the intake cam position sensor 13, monitoring crankshaft position using the crank sensor 19, and monitoring engine knock signal using the knock sensor 36 [Block 50]. The controller uses this information to determine the rotational position of the intake camshaft 17 relative to the rotational position of the crankshaft 20. When the controller determines the cam position relative to the crankshaft position is substantially near a default position, e.g. within two degrees rotation of default position [Block 52], it implements a global cylinder knock control strategy based upon the measured engine knock signal from the knock sensor 36 [Block 62]. When the controller determines the cam position is substantially different from the default position [Block 52], it implements an individual cylinder knock control strategy based upon the measured engine knock signal from the knock sensor 36 [Blocks 66–76]. Default position for a variable cam phasing system 18 typically comprises positioning or phasing the camshaft so intake valve 12 opens when the corresponding piston 14 of cylinder 15 is at top-dead center at the start of the intake cycle.

In operation, controller 10 controls the variable cam phasing system 18 in default mode when engine 5 is started or is operating at or near idle conditions, when the variable cam phasing system 18 experiences a failure, and when the variable cam phasing system 18 is disabled because of other operating conditions, e.g. excess engine oil temperature. The controller 10 controls the variable cam phasing system 18 in normal mode when engine 5 is operating above idle, and not experiencing the conditions described above. The normal operating mode typically comprises operating the variable cam phasing system 18 in a manner that each intake valve 12 opens in a range of thirty to sixty degrees before TDC ('BTDC'), depending upon engine operation.

As previously stated, the default position of the intake cam 17 relative to the crankshaft position is the camshaft position wherein the intake valve 12 for each cylinder 15 begins to open during the intake phase of typical four-cycle engine operation, i.e. as the piston 14 for the respective cylinder passes through a top-dead center ('TDC') point, and the piston is moving away from the engine head 22. In operation, controller 10 commands the variable cam phasing system 18 to advance the opening time of the intake valve 12 relative to the piston 14 position. The phasing system 18 is operable to rotate the intake camshaft 17 over a range up to a full advance position. When the exemplary phasing system is at the full advance position, the position of intake cam 17 relative to the crankshaft position is such that the intake valve 12 for each cylinder 15 preferably begins to open as much as sixty degrees before TDC ('BTDC') initiating the intake phase, i.e. during a portion of the preceding exhaust stroke. Typically, the exemplary system operates at an opening in the range of thirty to forty degrees BTDC. Correspondingly, the time window for knock detection is defined as a time period during which the knock signal is monitored for detection of engine knock, to avoid mechanical noise interference from closing of the engine valves 12, 32. When the variable cam phasing system 18 is in default position, the time window is described as a modified time window, which in this embodiment is an early time window (see FIG. 2, Block 60). When the variable cam phasing system 18 is in advanced position, the preferred time window for knock detection is described as a normal time window [Block 72]. The modified time window and the normal time window are typically defined by an initial crank angle at which knock measurement is monitored, typically near TDC, and an elapsed time for monitoring of knock signal, in this embodiment about three milliseconds, as shown hereinafter.

Referring again to FIG. 2, when the determined cam position relative to crankshaft position is substantially near the default position [Block 52], the global knock control strategy is implemented [Block 62], based upon the engine knock signal input. This includes determining which engine cylinder is being monitored [Block 50], and selecting a knock signal threshold based upon the determined cylinder [Block 56, 58]. Each cylinder is determined by a skilled practitioner during preproduction engine development to be a 'noisy' cylinder or 'normal' cylinder, and such information is used during the ongoing engine operation [Block 54]. A noisy cylinder is defined as a cylinder wherein the engine controller is unable to reliably distinguish between input to the knock sensor 36 caused by combustion auto-ignition and input caused by ongoing engine operation. A noisy cylinder may occur because of placement of the knock sensor or other limitations. In contrast, a normal cylinder is defined as a cylinder wherein the engine controller is able to reliably distinguish between input to the knock sensor 36 caused by combustion auto-ignition and input caused by ongoing engine operation. In operation, when a noisy cylinder is being monitored, the knock detection threshold is set to a high value, K_Thresh_High [Block 56], which effectively eliminates the cylinder then being monitored from the detection portion of the knock detection and control strategy. When a normal cylinder is being monitored, the knock detection threshold is set to a normal value, K_Thresh_Normal [Block 58], and signal input from the cylinder is used in the detection portion of the knock detection and control strategy.

Furthermore, when the determined cam position relative to crankshaft position is substantially near the default position, the controller monitors the knock sensor signal input during the modified time window [Block 60]. The global knock control strategy or algorithm is then implemented [Block 62], using the knock detection threshold, K_Thresh, as described hereinabove. The global knock control strategy [Block 64] preferably comprises reducing or eliminating engine auto-ignition by retarding timing of spark ignition to spark plugs of each of the cylinders when the engine knock signal exceeds the selected knock signal threshold for any one of the cylinders during the modified time window. A skilled practitioner is able to calibrate the global knock control algorithm to optimize magnitude of ignition retard during engine knock to prevent damage to the engine while maintaining engine operation at or near peak performance.

Referring again to FIG. 2, when the determined cam position relative to crankshaft position is substantially different from the default position, the individual knock control strategy is implemented [Block 74]. This includes monitoring cam position [Block 50], determining whether the cam position is in a transient mode [Block 68], and comparing the monitored or actual cam position to a scheduled cam position [Block 66]. Whether the variable cam phaser is in transient mode is preferably determined by the controller 10, wherein it is determined whether engine operating conditions have changed, indicating to the variable cam phaser control system in the controller to move position of the cam phaser 18, and determined whether the variable cam phaser system has been commanded by the controller to move, using the oil control valve as described hereinabove. The controller 10 of this embodiment is operable to monitor engine operating conditions including throttle position, engine speed, and engine load as part of ongoing engine control, including control of the variable cam phaser system 18. The controller 10 determines the variable cam phaser system 18 is in transient mode when a change in any of the throttle position, engine speed, or engine load exceeds a predetermined threshold.

The scheduled cam position is the cam position to which the controller 10 is attempting to control the camshaft, cam phaser, and hence intake valve opening time, relative to the crankshaft and corresponding piston position. When the monitored cam position is within an allowable range of the scheduled cam position [Block 66, 78], shown as Thresh_Cam, and defined as within a difference of five degrees of camshaft rotation, then the knock detection threshold is set to the normal value, K_Thresh_Normal, and signal input from the cylinder is used in the detection portion of the knock detection and control strategy. When the monitored cam position is in transient mode [Block 78] or outside the allowable range of the scheduled cam position [Block 66], shown as Thresh_Cam, the normal value for the knock detection threshold is increased by an offset to accommodate transient noise in the engine system, K_Thresh=K_Thresh_Normal+Transient. Signal input from the knock sensor 36 for the cylinder 15 is used in the detection portion of the knock detection and control strategy. In either case, when the determined cam position relative to crankshaft position is different from the default position, the controller monitors the knock sensor signal input during the normal time window [Block 72]. The individual knock control strategy or algorithm is then implemented [Block 74, 76], using the knock detection threshold, K_Thresh, as described hereinabove. The individual knock control strategy preferably comprises reducing or eliminating engine auto-ignition by controlling ignition timing, typically in the form of retarding ignition timing, to the specific cylinder being monitored when the engine knock signal exceeds the selected knock signal threshold for that cylinder during the normal time window. A skilled practitioner knows how to calibrate the individual knock control algorithm to optimize magnitude of ignition timing retard during engine knock to prevent damage to the engine while maintaining engine operation at or near peak performance.

Figure 3:
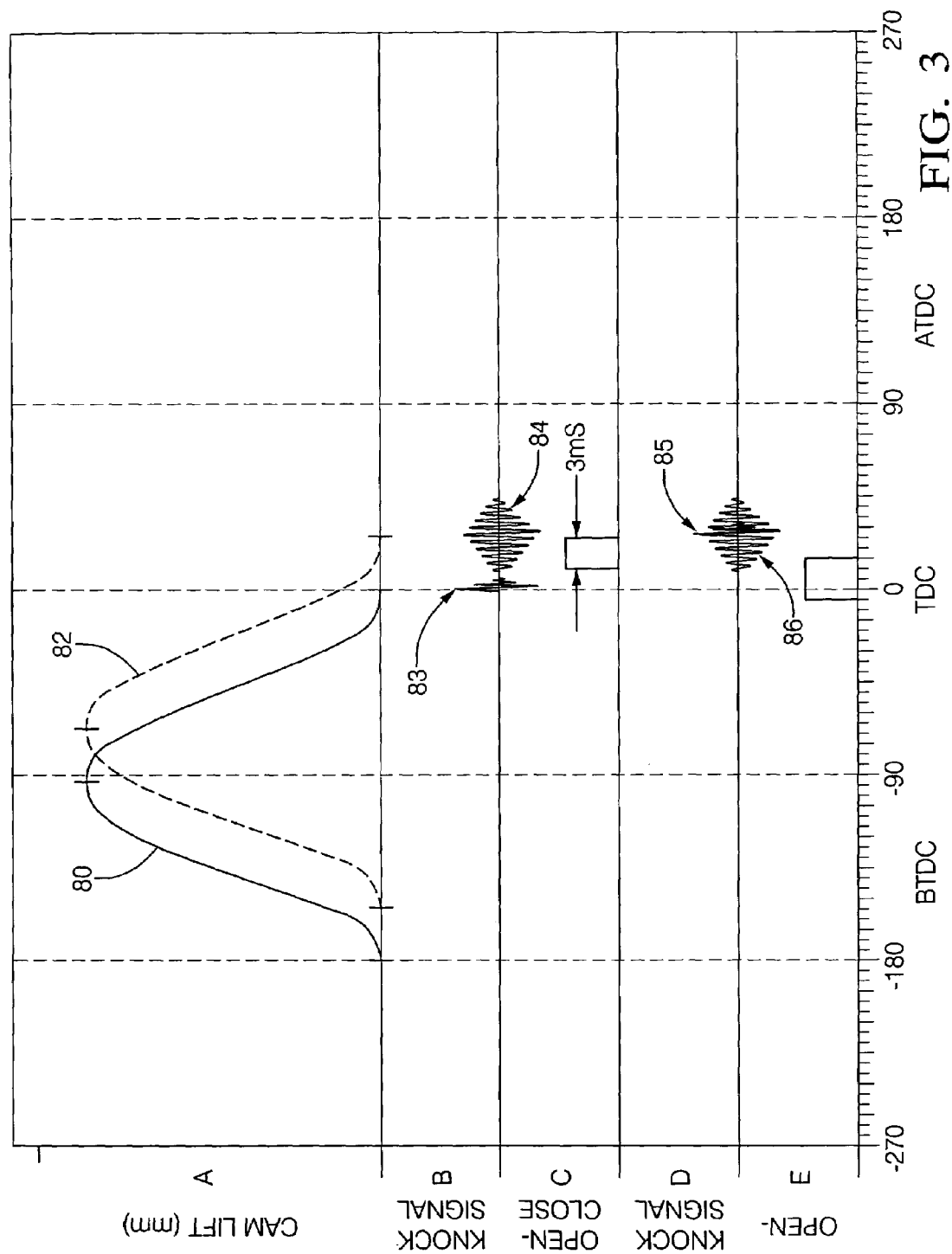
FIG. 3 is a graph comprising descriptive data, in accordance with an embodiment of the present invention.

Referring now to FIG. 3, a graphical representation of data from operation of an embodiment in accordance with the invention is shown. The exemplary embodiment comprises a six-cylinder internal combustion engine arranged in a V configuration, with dual overhead camshafts, wherein each of the two intake camshafts includes variable intake valve timing control using variable cam phasing. The cylinders are numbered as follows: left bank of the V configuration consists of cylinder numbers one, three, and five, and the right bank consists of cylinder numbers two, four, and six, with cylinders number one and two being at the front of the engine, near pulleys, and cylinders number five and six being at the rear of the engine, near a transmission. Exemplary cylinder ignition firing order is one-two-three-four-five-six. In this engine configuration, closing of intake valves of cylinder three creates mechanical noise that may interfere with knock detection on cylinder one. Referring to FIG. 3, the representative graph referred to as waveform A shows characteristic opening curve for an intake valve 12 of cylinder three in normal operation 80 (described hereinabove) wherein the controller 10 is controlling the variable cam phasing system 18 so each intake valve begins opening about thirty degrees BTDC and closing at about one hundred fifty degrees after TDC ('ATDC'). Also shown in waveform A is a characteristic opening curve for an intake valve 12 of cylinder three in default operation 82 (described hereinabove) wherein the controller 10 is controlling the variable cam phasing system 18 so each intake valve begins opening at about TDC, and closes about one hundred eighty degrees ATDC.

Waveform B shows a typical knock signal for cylinder one when in normal operation, including element 83 comprising knock signal predominantly caused by valve noise from cylinder three and element 84 comprising knock signal predominantly caused by auto-ignition events in cylinder one. Waveform C shows normal time window for knock detection (see, also Block 72 of FIG. 2). The normal time window in this embodiment begins at about ten degrees ATDC and is open for about three milliseconds, which is about thirty seven degrees ATDC when the engine is operating at 1500 rpm. Waveform D shows a typical knock signal for cylinder one when in default operation, including element 85 comprising a knock signal caused by both valve noise from cylinder three and auto-ignition events in cylinder one, and element 86 comprising a knock signal predominantly caused by auto-ignition events in cylinder one. Waveform E shows modified time window for knock detection (see, also Block 60 of FIG. 2). The modified time window in this embodiment begins at about five degrees BTDC, and is open for three milliseconds, which is about twenty two degrees ATDC when the engine is operating at 1500 rpm.

The invention has been described with specific reference to the embodiment described hereinabove, i.e., a method and system to control a conventional dual overhead cam spark-ignition internal combustion engine having a variable cam phasing system operable to control intake cam phasing. However, it is understood that the concept may be readily applied to engine systems controlling cam phasing of both the intake and exhaust camshaft, and to engine systems employing variable valve lift and variable valve opening time strategies. Furthermore, it is readily apparent that the invention applies to all spark ignition engines equipped with knock control strategies, including direct-injection engines. It is also readily apparent that the invention applies to any method and apparatus of detecting engine knock or auto-ignition events, including for example, use of multiple piezoelectric accelerometer devices operable to sense vibration, use of one or more cylinder pressure sensors, or use of ionization-current sense systems. Further modifications and alterations may occur to others upon reading and understanding the specification. It is intended to include all such modifications and alterations insofar as they come within the scope of the invention.

Having thus described the invention, the following is claimed:

1. A method to control a spark-ignition internal combustion engine having a plurality of cylinders and a variable cam phasing system, comprising:
monitoring cam position, and, engine knock signal;
determining cam position, based upon the monitored cam position;
implementing a global cylinder knock control strategy based upon the engine knock signal, when the determined cam position is substantially near a default position;
implementing an individual cylinder knock control strategy based upon the engine knock signal, when the determined cam position indicates the variable cam phasing system is operating in a transient mode; and,
implementing an individual cylinder knock control strategy based upon the engine knock signal, when the determined cam position is substantially different from the default position.

2. The method of claim 1, wherein implementing a global cylinder knock control strategy based upon the engine knock signal, when the determined cam position is substantially near the default position comprises:
determining which cylinder of the plurality of cylinders is being monitored;
selecting a knock signal threshold based upon the determined cylinder;
selecting a modified time window during which the engine knock signal is monitored; and,
controlling ignition timing to each of the plurality of cylinders when the engine knock signal exceeds the selected knock signal threshold for any one of the plurality of cylinders during the selected modified time window.

3. The method of claim 2, wherein selecting a knock signal threshold based upon the determined cylinder comprises:
selecting a normal knock threshold when the determined cylinder is a normal cylinder; and,
selecting a high knock threshold when the determined cylinder is a noisy cylinder.

4. The method of claim 3, wherein selecting a modified time window during which the engine knock signal is monitored comprises selecting a time window that substantially completely excludes a corresponding valve closing.

5. The method of claim 4, wherein controlling ignition timing to each of the plurality of cylinders when the engine knock signal exceeds the selected knock signal threshold for any one of the plurality of cylinders during the selected modified time window comprises retarding ignition timing to each of the plurality of cylinders.

6. The method of claim 1, wherein implementing the individual cylinder knock control strategy based upon the engine knock signal, when the determined cam position is substantially different from the default position comprises:
determining which cylinder of the plurality of cylinders is being monitored;
determining a scheduled cam position;
selecting a knock signal threshold based upon the monitored cam position and the scheduled cam position;
selecting a normal time window during which the engine knock signal is monitored; and,
controlling ignition timing to the monitored cylinder when the engine knock signal exceeds the selected knock signal threshold for the monitored cylinder during the selected normal time window.

7. The method of claim 6, wherein selecting the normal time window during which the engine knock signal is monitored comprises selecting a time window that substantially completely excludes a corresponding valve closing.

8. The method of claim 7, wherein controlling ignition timing to the monitored cylinder when the engine knock signal exceeds the selected knock signal threshold for the monitored cylinder during the selected normal time window comprises retarding ignition timing to the monitored cylinder.

9. The method of claim 1, wherein implementing the individual cylinder knock control strategy based upon the engine knock signal, when the determined cam position indicates the variable cam phasing system is operating in a transient mode comprises:
determining which cylinder of the plurality of cylinders is being monitored;
determining the controller has commanded the cam phaser to move;
selecting a knock signal threshold based upon the monitored cam position and a transient offset value;
selecting an normal time window during which the engine knock signal is monitored; and,
controlling ignition timing to the monitored cylinder when the engine knock signal exceeds the selected knock signal threshold for the monitored cylinder during the selected normal time window.

10. A control system for a spark-ignition internal combustion engine equipped with a variable cam phasing system, comprising:

said engine equipped with an ignition system, a knock sensor, a cam sensor, a crank sensor; and, an electronic controller, said controller operable to: monitor cam position with the cam sensor, monitor crank position with the crankshaft position sensor, monitor engine auto-ignition with the knock sensor, and control ignition with the ignition system, said controller operable to:

determine cam position relative to crankshaft position, based upon the monitored cam position and the monitored crankshaft position;

implement a global cylinder knock control strategy based upon the engine knock signal, when the determined cam position relative to crankshaft position is substantially near a default position; and, implement an individual cylinder knock control strategy based upon the engine knock signal, when the determined cam position relative to crankshaft position is substantially different from the default position;

wherein the controller operable to implement the global cylinder knock control strategy based upon the engine knock signal, when the determined cam position relative to crankshaft position is substantially near the default position comprises the controller operable to:

determine which cylinder of the plurality of cylinders is being monitored;

select a knock signal threshold based upon the determined cylinder;

select an modified time window during which the engine knock signal is monitored; and, control ignition timing to each of the plurality of cylinders when the engine knock signal exceeds the selected knock signal threshold for any one of the plurality of cylinders during the selected modified time window.

* * * * *